United States Patent
Satoh et al.

(10) Patent No.: US 7,446,768 B2
(45) Date of Patent: Nov. 4, 2008

(54) VIRTUAL IMAGE DISPLAY APPARATUS AND METHOD USING CALIBRATED MEASUREMENT OF ATTITUDE SENSOR

(75) Inventors: Kiyohide Satoh, Kanagawa (JP); Mahoro Anabuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 276 days.

(21) Appl. No.: 10/278,947

(22) Filed: Oct. 24, 2002

(65) Prior Publication Data
US 2003/0080976 A1 May 1, 2003

(30) Foreign Application Priority Data
Oct. 26, 2001 (JP) .............................. 2001-329360

(51) Int. Cl.
*G06T 15/20* (2006.01)
*G09G 5/00* (2006.01)

(52) U.S. Cl. ............................ 345/427; 345/7; 345/8; 345/632; 345/633

(58) Field of Classification Search ................. 345/632, 345/633, 427
See application file for complete search history.

(56) References Cited

U.S. PATENT DOCUMENTS

| | | | | |
|---|---|---|---|---|
| 4,583,094 A | * | 4/1986 | Mosier | 340/975 |
| 5,682,332 A | * | 10/1997 | Ellenby et al. | 702/150 |
| 6,057,856 A | * | 5/2000 | Miyashita et al. | 345/633 |
| 6,064,335 A | * | 5/2000 | Eschenbach | 342/357.06 |
| 6,064,398 A | * | 5/2000 | Ellenby et al. | 345/633 |
| 6,166,744 A | * | 12/2000 | Jaszlics et al. | 345/629 |
| 6,298,286 B1 | * | 10/2001 | Ying | 701/4 |
| 6,760,027 B2 | * | 7/2004 | Endo et al. | 345/427 |
| 2002/0095265 A1 | | 7/2002 | Satoh et al. | 702/94 |
| 2002/0140709 A1 | * | 10/2002 | Sauer et al. | 345/633 |
| 2003/0105588 A1 | * | 6/2003 | Lin et al. | 702/1 |

FOREIGN PATENT DOCUMENTS

JP    2001-50990    2/2001    .................. 702/94

OTHER PUBLICATIONS

U.S. Appl. No. 10/274,200 Sauer et al., Image Display Apparatus and Method, and Storage Medium, filed Oct. 26, 2001.*

(Continued)

*Primary Examiner*—Ulka Chauhan
*Assistant Examiner*—Daniel F Hajnik
(74) *Attorney, Agent, or Firm*—Fitzpatrick, Cella, Harper & Scinto (57) ABSTRACT

An image display apparatus and method generate a computer-graphic image onto the display of a real scene, using output values from an attitude sensor to provide angle of inclination and fixed values for the angle of direction of the perspective of the display. The result is an image in which the CG image is aligned correctly along the angle of inclination and is misaligned only in the angle of direction. A user then adjust the angle of direction while observing the display and inputs an instruction when the virtual image and the real scene come into alignment, thus correcting the correction information. As a result, attitude adjustment is carried out more easily because it is not necessary for the user to fix the angle of inclination of the perspective.

6 Claims, 8 Drawing Sheets

OTHER PUBLICATIONS

U.S. Appl. No. 10/266,683, filed Oct. 9, 2002.
U.S. Appl. No. 09/799,518, filed Mar. 7, 2001.
M. Anabuki, et al., "A Wearable Mixed Reality System for Outdoor Use: System and Applications", by the Virtual Reality Society of Japan, pp. 277-280 (Sep. 19, 2001), with partial English translation.
K. Sato, et al, "Registration of Physical and Virtual Spaces in Mixed Reality Systems" by the Virtual Reality Society of Japan, pp. 161-164 (Sep. 18, 1997), with partial English translation.
M. Bajura, et al., "Dynamic Registration Correction in Augmented-Reality Systems", Proceedings of the Virtual Reality Annual International Symposium, IEEE Comp. Soc. Press, pp. 189-196 (Mar. 11, 1995).
R. Azuma, et al., "Improving Static and Dynamic Registration in an Optical See-Through HMD", Computer Graphics Proceedings, Annual Conference Series, pp. 197-204 (1994).
R. Azuma, "A Survey of Augmented Reality", Presence: Teleoperators and Virtual Environment, pp. 1-48 (Aug. 1997).
R. Azuma, et al., "Recent Advances in Augmented Reality", IEEE Computer Graphics and Applications, IEEE Service Center, vol. 21, No. 6, pp. 34-46 (Nov. 6, 2001).

* cited by examiner

VIRTUAL IMAGE DISPLAY APPARATUS AND METHOD USING CALIBRATED MEASUREMENT OF ATTITUDE SENSOR

FIELD OF THE INVENTION

The present invention relates to an image display apparatus and method for displaying an image in virtual space fused with real space based on output values from an attitude sensor, and more particularly, to an image display apparatus that generates and displays on a display screen an overlapped image superimposing a virtual space image onto a real image sensed by an image-sensing apparatus, or an image display apparatus that displays a virtual space image on the optical see-through display screen by optically transmitting real space through the display screen, and a method and recording medium for same.

BACKGROUND OF THE INVENTION

In recent years, research into so-called mixed reality (MR) systems, representing a seamless conjunction between real space and virtual space, has been actively pursued.

In general, there are two main types of MR systems: A video see-through system, in which an image in virtual space (such as a virtual object or text information drawn by computer graphics, for example (hereinafter CG)) is superimposed on an image of real space that has been sensed by an image-sensing apparatus such as a video camera or the like, and an optical see-through system, in which real space is optically transmitted through the display screen of a display apparatus and the virtual space image is overlappingly displayed on that display screen.

There is a wide array of applications of this type of MR, which is qualitatively completely different from hitherto existing virtual reality systems. Such applications include navigation systems that overlappingly display names and directories on buildings and the like on real streets, as well as landscape simulations that overlappingly display a computer graphic image of the building scheduled to be erected at a building construction site.

What these various applications have in common is the need for precise, accurate alignment between the real space and the virtual space, and conventionally a variety of efforts have been made to satisfy this requirement.

The problem of alignment in video see-through systems MR boils down to the problem of obtaining a 3-dimensional position/attitude of the perspective of the image-sensing apparatus within a global coordinate system set to real space (hereinafter simply called "global coordinate system"). The problem of alignment in optical see-through systems MR can also be said to similarly boil down to the problem of obtaining a 3-dimensional position/attitude of the perspective of the observer (user) within a global coordinate system.

One common method of solving the above-described problem involves the use of position/attitude sensors such as magnetic sensors, ultrasonic sensors or the like to obtain a 3-dimensional position/attitude of the image-sensing apparatus or observer perspective within the global coordinate system.

Similarly, in outdoor settings, under circumstances in which there is sufficient distance between the image-sensing apparatus or observer and the object so that a fixed value may be used for the position of the perspective, the problem of alignment boils down to the problem of obtaining the 3-dimensional attitude of the perspective. In this case, 3-dimensional attitude sensors composed of a combination of gyro sensors and accelerometers are used to obtain the 3-dimensional attitude.

The output values output by the 3-dimensional attitude sensors, is the 3-dimensional attitude of the sensors themselves in the sensor coordinate system. Here, in case of Tokimec Inc. attitude sensors TISS-5-40, for example, a sensor coordinate system is a coordinate system that defines the Y axis as the opposite direction of the pull of gravity and the -Z axis as a frontal direction of a sensor when activated atop an X-Z plane defined by this Y axis. In this manner, the output values output by the 3-dimensional attitude sensors are typically not the 3-dimensional attitude of the perspective in a global coordinate system that is the measurement object. In other words, the sensor output values themselves cannot be used as a 3-dimensional attitude of the perspective in a global coordinate system but must undergo some sort of coordinate conversion. More specifically, the sensor attitudes must be coordinate-converted to the perspective attitudes and attitudes in the sensor coordinate system must be converted to attitudes in the global coordinate system. It should be noted that, in the present specification, the data for carrying out coordinate conversion between the sensor output values and the 3-dimensional attitude of the perspective in a global coordinate system is called correction information.

Figure 1:
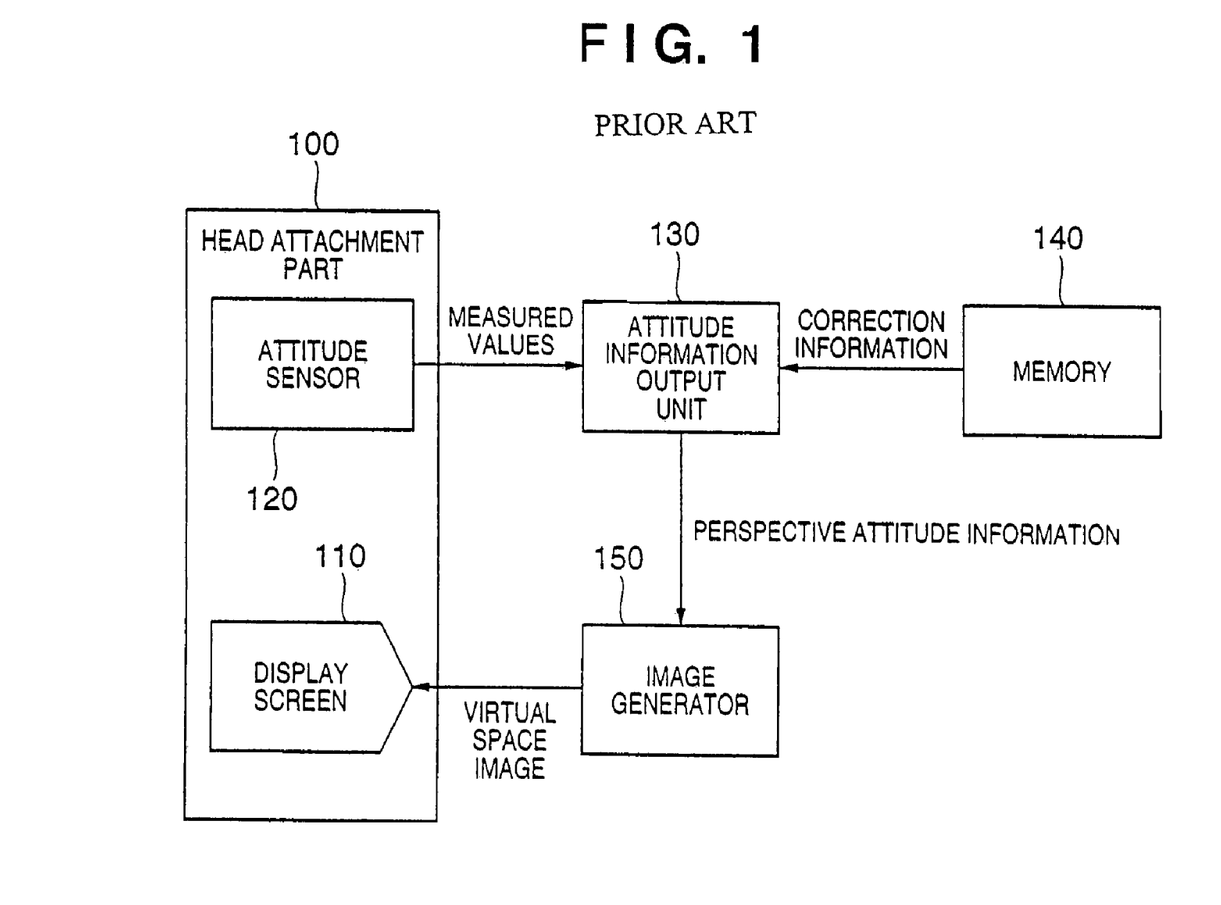
FIG. 1 shows the structure of a conventional image display apparatus for displaying MR via the optical see-through system.

FIG. 1 shows the structure of a conventional image display apparatus for displaying MR via the optical see-through system.

As shown in the diagram, a display screen 110 is a see-through type, and together with an attitude sensor 120 is fixedly mounted on a head attachment part 100. When a user (not shown in the diagram) attaches the head attachment part 100 so that the display screen 110 is positioned before his or her eyes, the user can observe the real space in front of the display screen through an optical system (not shown in the diagram) of the display screen 110. The attitude sensor 120 measures its own attitude in the sensor coordinate system and outputs attitude measurements in three degrees of freedom. It should be noted that the attitude sensor 120 has an internal inclinometer (not shown in the diagram) capable of measurement in the direction of the pull of the earth's gravity, and as described above, one of the axes of the sensor coordinate system (in the present example, the Y axis) is set so as to be in the reverse direction of the pull of gravity.

The attitude information output unit 130 changes the measurements input from the attitude sensor 120 in accordance with the correction information retained in a memory 140. The attitude information output unit 130 computes the attitude of the user's perspective within a global coordinate system and outputs the result as perspective attitude information. An image generator 150 generates a virtual image corresponding to the user's perspective attitude in accordance with the perspective attitude information input from the attitude information output unit 130 and outputs that virtual image. The display screen 110 then displays the virtual image input from the image generator 150. With such a configuration, the user can see a virtual image displayed on the display screen 110 superimposed on an image of real space via the display screen 110.

Next, using FIG. 2, a description will be given of a method of calculating the user perspective attitude in a global coordinate system with the attitude information output unit 130.

Figure 2:
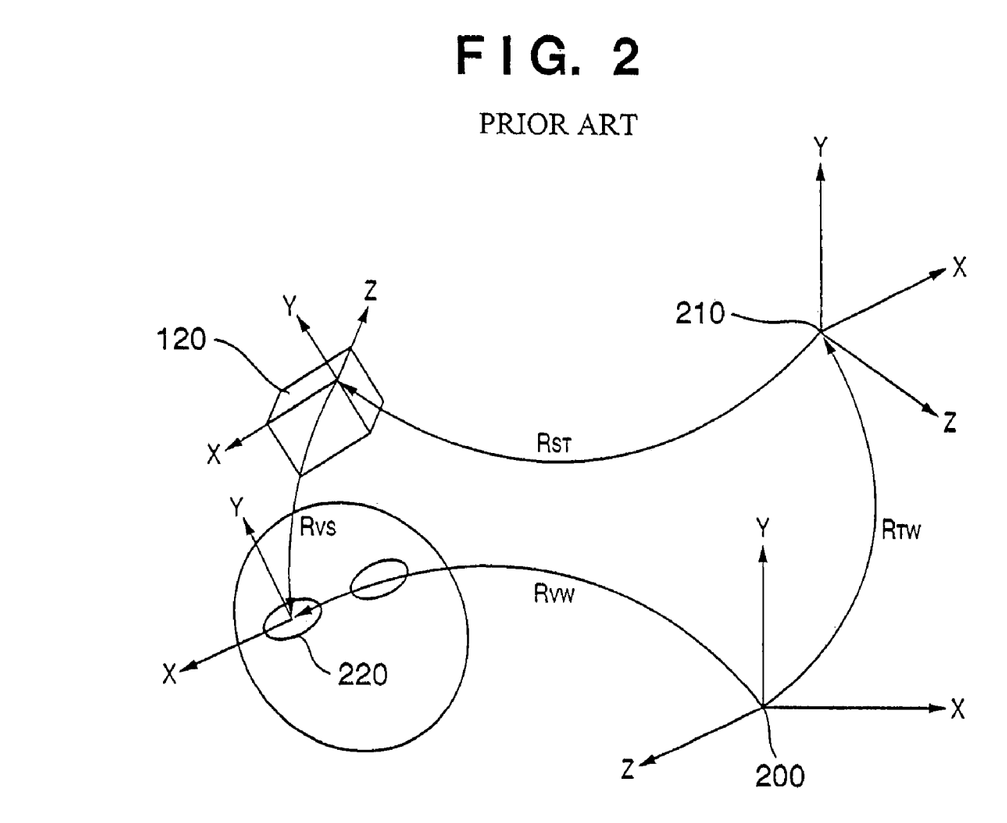
FIG. 2 illustrates a method of calculating an attitude of a user perspective in a the global coordinate system, using an attitude information output unit 130.

As shown in FIG. 2, the attitude of a sensor coordinate system 210 in a global coordinate system 200 is denoted as $R_{TW}$, the attitude of the attitude sensor 120 in the sensor coordinate system 210 is denoted as $R_{ST}$, the relative attitude of the user perspective 220 as seen from the attitude sensor 120 is denoted as $R_{VS}$, and the attitude of the user perspective 220 in the global coordinate system 200 is denoted as $R_{VW}$.

Here, R is a 4×4 matrix, where $R_{BA}$ describes the attitude of an object B in a given coordinate system A. In other words, this matrix is a coordinate conversion matrix for converting from a coordinate system A to a coordinate system B that an object B defines, and defines the conversion formula $P_B = R_{BA} P_A$ that converts the coordinates $P_A = (X_A, Y_A, Z_A, 1)^T$ in coordinate system A to coordinates $P_B = (X_B, Y_B, Z_B, 1)^t$ in coordinate system B. That is, the user's perspective 220 in the global coordinate system 200 denoted as $R_{VW}$ can be said to be a coordinate conversion matrix ($P_V = R_{VW} P_W$) for the purpose of converting the global coordinate system 200 coordinates $P_W = (X_W, Y_W, Z_W, 1)^T$ into the user's perspective coordinate system 230 coordinates $P_V = (X_V, Y_V, Z_V, 1)^T$.

The Matrix R is the product of a rotation matrix Rx defined by an angle of rotation θ about the X axis, a rotation matrix Ry defined by an angle of rotation (angle of direction) φ about the Y axis, and a rotation matrix Rz defined by an angle of rotation ψ about the Z axis, so as to satisfy the equation R=RzRxRy. Each of these matrixes is expressed as follows:

$$Rx(\theta) = \begin{bmatrix} 1 & 0 & 0 & 0 \\ 0 & \cos\theta & \sin\theta & 0 \\ 0 & -\sin\theta & \cos\theta & 0 \\ 0 & 0 & 0 & 1 \end{bmatrix},$$

$$Ry(\phi) = \begin{bmatrix} \cos\phi & 0 & -\sin\phi & 0 \\ 0 & 1 & 0 & 0 \\ \sin\phi & 0 & \cos\phi & 0 \\ 0 & 0 & 0 & 1 \end{bmatrix},$$

$$Rz(\psi) = \begin{bmatrix} \cos\psi & \sin\psi & 0 & 0 \\ -\sin\psi & \cos\psi & 0 & 0 \\ 0 & 0 & 1 & 0 \\ 0 & 0 & 0 & 1 \end{bmatrix}$$

Formula 1 where $R_{VW}$ can be shown by $R_{VW} = R_{VS}\_R_{ST}\_R_{TW}$  (Formula A)

Here, the Y axis of the sensor coordinate system 210 is set in a direction that is the reverse of gravity, so by defining the Y axis of the global coordinate system 200 as perpendicular to the plane of the horizon, the directions of the Y axes of the global coordinate system 200 and the sensor coordinate system can be made to coincide. At this time the components around the X axis and Z axis of $R_{TW}$, that is, $Rx_{TW}$ and $Rz_{TW}$, each become unit matrixes, with $R_{TW}$ becoming equivalent to the rotational matrix $Ry_{TW}$ defined by the angle of rotation $\phi_{TW}$ around the Y axis. Therefore, Formula A described above changes to $R_{VW} = R_{VS}\_R_{ST}\_Ry_{TW}$  (Formula B)

where $R_{ST}$ is the input from the attitude sensor 120 to the attitude information output unit 130 and $R_{VW}$ is the output from the attitude information output unit 130 to the image generator 150. $R_{VS}$ and $Ry_{TW}$ (in other words, the angles of rotation $\theta_{VS}, \phi_{VS}$ and $\psi_{VS}$ about the three axes that define $R_{VS}$ and the angle of rotation $\phi_{TW}$ that defines $Ry_{TW}$) correspond to correction information needed in order to convert $R_{ST}$ to $R_{VW}$. Using the $R_{ST}$ input from the attitude sensor 120 as well as the $R_{VS}$ and $Ry_{TW}$ retained in the memory 140, the attitude information output unit 130 calculates $R_{VW}$ based on Formula B described above and outputs same to the image generator 150.

In order to align real space and virtual space accurately, correction information must be accurately set in the memory 140 by some means. Only after accurate correction information has been provided can display of a virtual image accurately positioned in real space be achieved.

One commonly known method for setting correction information involves a user or an operator dialogically increasing and decreasing each of the values for $\theta_{VS}$, $\phi_{VS}$, $\psi_{VS}$ and $\phi_{TW}$ stored in the memory 140 via an input means not shown in the diagram and adjusting the values through a process of trial and error until an accurate alignment is achieved.

However, with such a method, four parameters must be adjusted simultaneously, which is difficult and time-consuming.

One method of reducing this difficulty is a method proposed in Japanese Patent Application No. 2001-050990 (which corresponds to U.S. patent application Ser. No. 09/818,600 filed on Mar. 28, 2001), a description of which is given below.

Figure 3:
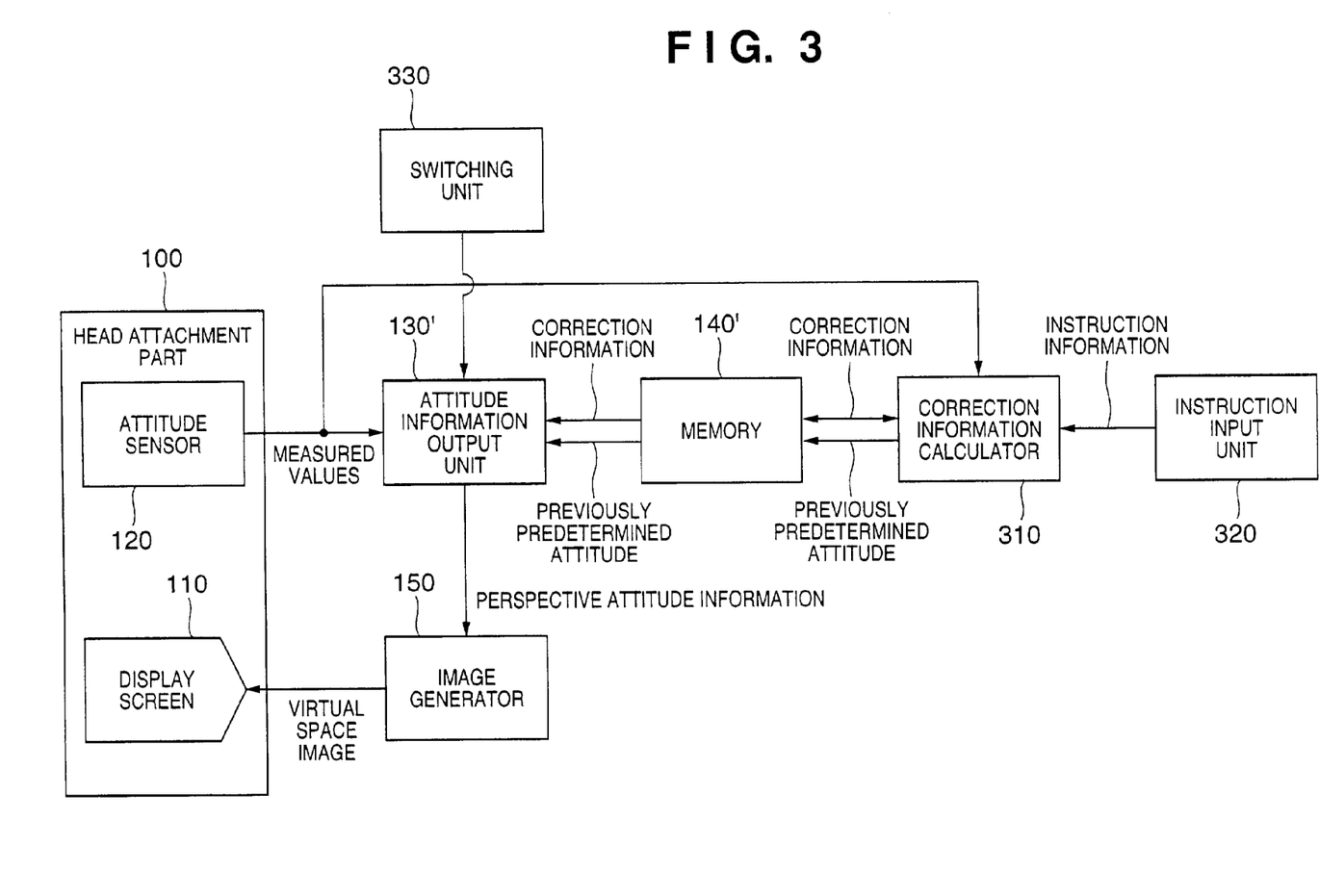
FIG. 3 is a block diagram of an image display apparatus equipped with a correction information calculator.

FIG. 3 is a block diagram of an image display apparatus when this correction information setting method is incorporated into the image display apparatus of FIG. 1.

As shown in the diagram, the present composition is the same as that shown in FIG. 1, though with the addition of a correction information calculator 310, an instruction input unit 320 and a switching unit 330. In the image display apparatus of FIG. 3, the compositional elements that correspond to the attitude information output unit 130 as well as the memory 140 perform differently from their counterpart elements in the image display apparatus of FIG. 1, so these elements are labeled attitude information output unit 130' and memory 140' in recognition of that functional difference.

The calculation of the correction information is performed by moving the attitude of the user's perspective 220 to attitude $Ry^0_{VW}$ and obtaining the attitude sensor 120 output $R^0_{ST}$ at that point. It should be noted that attitude $Ry^0_{VW}$ is a particular preset attitude in the global coordinate system, and has a visual axis that is horizontal to the plane of the horizon. The memory 140' holds the preset perspective attitude $Ry^0_{VW}$ (or the rotation $\phi_{VW}$ about the Y axis defining it)).

The switching unit 330 receives input from the user or operator (neither being shown in FIG. 3) and sets the mode of the attitude information output unit 130' to either a normal mode or a correction information calculation mode.

When set to the normal mode, the attitude information output unit 130', as with the attitude information output unit 130 described with reference to FIG. 1, calculates $R_{VW}$ using correction information from the $R_{ST}$ input from the attitude sensor 120, and outputs same to the image generator 150 as perspective attitude information.

If the attitude information output unit 130' is set to the correction information calculation mode, however, then the attitude information output unit 130' inputs $Ry^0_{VW}$ from the memory 140' and outputs same to the image generator 150 as perspective attitude information. The instruction input unit 320 receives the input from the user or operator and transmits an instruction to execute a correction information calculation to the correction information calculator 310. More specifically, the user or operator, in the correction information calculation mode, adjusts the attitude of the perspective 220 until the virtual image displayed on the display screen 110 and the image of real space observed by optically seeing through the display screen 110 are in the correct positional relationship. Then, when the user or operator determines that both images sufficiently overlap each other (that is, at the point at which the user or operator determines that the perspective 220 is positioned at the attitude $Ry^0{}_{VW}$), he or she inputs that information to the instruction input unit 320 by, for example, pressing a particular key.

The correction information calculator 310 inputs the instruction to calculate correction information from the instruction input unit 320, inputs output $R^0{}_{ST}$ of the attitude sensor 120 at that point (that is, at the point at which the user or operator determines that the perspective 220 is positioned at the attitude $Ry^0{}_{VW}$), and calculates the correction information based on the attitudes $Ry^0{}_{VW}$ and $R^0{}_{ST}$.

With the method described above, the Y axis rotational component $Ry_{SV}$ (or the angle of rotation $\phi_{SV}$ around the Y axis that defines the Y axis rotational component $Ry_{SV}$) of the reverse matrix $R_{SV}$ (which expresses the relative attitude of the attitude sensor 120 as seen from the user perspective 220) of the attitude $R_{VS}$ that is one piece of correction information must already be given by some method, and already stored in the memory 140'.

At this time, from the data processed by the correction information calculator 310, Formula B provides that $$Ry^0{}_{VW} = R_{VS}\_R^0{}_{ST}\_Ry_{TW} \quad \text{(Formula C)}$$

By varying Formula C, we get $$Ry^0{}_{VW} = (Rz_{VS}Rx_{SV}Ry_{SV})^{-1}R^0{}_{ST}Ry_{TW} \quad \text{(Formula D)}$$

The correction information calculator 310 inputs $Ry^0{}_{VW}$ and $Ry_{SV}$ from the memory 140', inputs $R^0{}_{ST}$ from the attitude sensor 120, and calculates the unknown correction information $Rz_{SV}$, $Rx_{SV}$ and $Ry_{TW}$ based on Formula D. The following shows the steps in that process.

That is, by further varying Formula D, we get $$Rz_{SV}Rx_{SV}Ry_{SV}Ry^0{}_{VW} = Rz^0{}_{ST}Rx^0{}_{ST}Ry^0{}_{ST}Ry_{TW} \quad \text{(Formula E)}$$

Both the left side and right side of the above equation have been multiplied by the rotational components of the X, Y, and Z axes, so identical equations exist for each of the rotational components of the Z, Y, and X axes.

First, the identical equations for rotational components of the Z and X axes, are obtained, which are as follows:

$$Rz_{SV} = Rz^0{}_{ST} \quad \text{(Formula F)}$$

$$Rx_{SV} = Rx^0{}_{ST} \quad \text{(Formula G)}$$

From the foregoing $Rz_{SV}$ and $Rx_{SV}$ can be obtained.

Similarly, the identical equation for the rotational component of the Y axis is as follows:

$$Ry_{SV}Ry^0{}_{VW} = Ry^0{}_{ST}Ry_{TW}$$

from which $$Ry_{TW} = Ry_{SV}Ry^0{}_{VW}Ry^0{}_{ST}{}^{-1} \quad \text{(Formula H)}$$

and from which $Ry_{TW}$ can be obtained.

The correction information calculator 310 calculates the correction information $Rz_{SV}$, $Rx_{SV}$, and $Ry_{TW}$ using the processes described above, and from these values further calculates $R_{VS}$ ($=(Rz_{SV}Rx_{SV}Ry_{SV})^{-1}$), and outputs $R_{VS}$ and $Ry_{TW}$ (or the angles of rotation $\theta_{VS}$, $\psi_{VS}$ and $\phi_{TW}$ that define these) to the memory 140'.

It should be noted that the derivation of $Ry_{SV}$ may be done through a process of trial and error using measurements made with a protractor or the like, or by using some other means.

As described above, merely by fixing the perspective attitude in three degrees of freedom at a predetermined attitude, unknown correction information can be easily extracted and it becomes possible to achieve accurate alignment.

So long as the display screen 110 and the attitude sensor 120 remain fixed relative to each other, the $R_{VS}$ part (or the angles of rotation $\theta_{SV}$ and $\psi_{SV}$) of the correction information remains unchanged. Thus, each time correction information is extracted (that is, when $R_{VS}$ becomes known), the only correction information that changes together with each use of the system is $Ry_{TW}$ (or the angle of rotation $\phi_{TW}$). However, with each use of the system the method described above requires the performance of the same operations as would be needed to extract all the correction information (that is, the operations required to fix the perspective in three degrees of freedom at a predetermined attitude).

However, a problem with the above-described method is that it is not easy to fix the perspective in three degrees of freedom at a predetermined attitude, and any deviation between the predetermined attitude and the actual attitude at the time the correction information is input appears as accidental error in the correction information. For this reason, the above-described correction calculations must be performed repeatedly, until adequate alignment is achieved.

SUMMARY OF THE INVENTION

The present invention is conceived against the backdrop of the above-described conventional art, and has as its object to obtain correction information for converting sensor measurements into global coordinate system perspectives more simply.

According to the present invention, the above-described problems are solved and objects achieved by an image display apparatus that displays a virtual image on a display screen according to a perspective of a user observing the display screen. The image display apparatus has an attitude sensor, a conversion unit, a calculation unit, a display unit, and a correction unit. The attitude sensor outputs attitude measurements. The conversion unit converts the attitude measurements from the attitude sensor into a perspective expressed in terms of a global coordinate system so as to obtain the user perspective. The calculation unit calculates the perspective based on the attitude measurements from the attitude sensor using an angle of direction previously stored in a memory as the angle of direction in the global coordinate system of the attitude sensor so as to correct the correction information. The display unit for generating a virtual image using the perspective calculated by the calculation unit. The correction unit corrects the correction information based on the attitude measurements from the attitude sensor and the angle of direction when a predetermined instruction is input during display of the virtual image by the display unit.

Other objects, features and advantages of the present invention will be apparent from the following description, taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which.

DETAILED DESCRIPTION OF THE PREFERRED EMBODIMENTS

Preferred embodiments of the present invention will be described in detail in accordance with the accompanying drawings.

Figure 4:
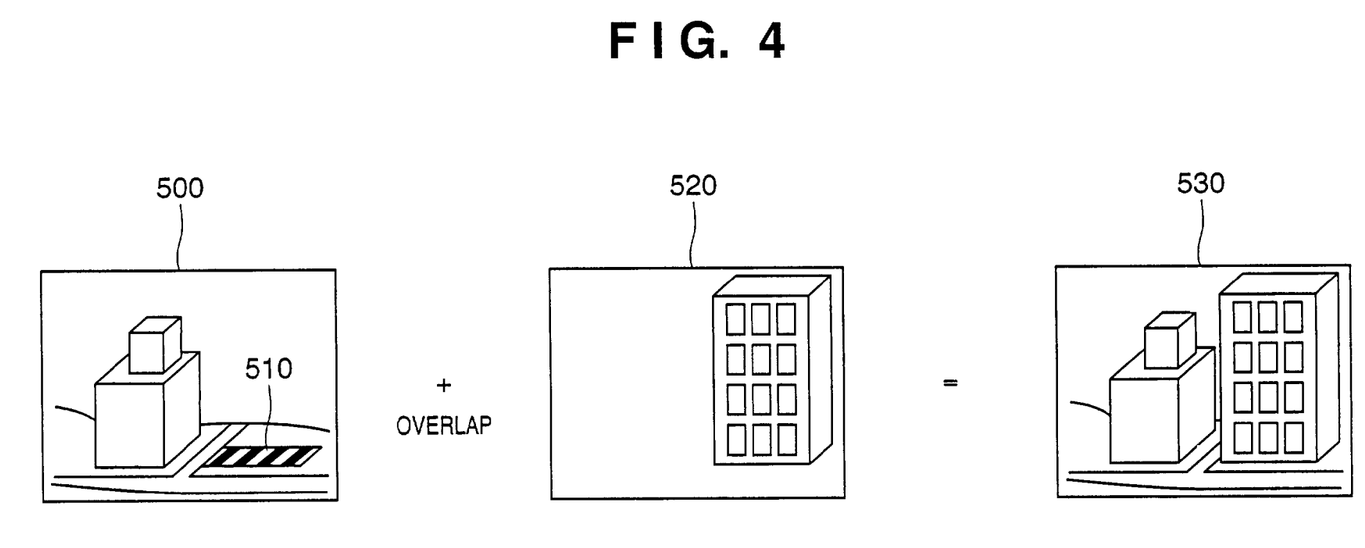
FIG. 4 shows an example of an image presented by scene simulation according to a first embodiment of the present invention.

FIG. 4 shows an example of an image presented to a user by a scene simulation apparatus according to a first embodiment of the present invention. That is, when a user (not shown in the diagram) is observing a real scene 500 that includes a building site 510, the simulation apparatus of the present embodiment generates a computer graphic image 520 of the building in accordance with the perspective of the user, the display of which shows the user an image 530 of the building to be built at the building site 510 just as if it were already built.

In addition to a correction information calculation method that obtains the correction information $R_{VS}$ and $Ry_{TW}$ (or the angles of rotation $\theta_{SV}$, $\psi_{SV}$ and $\phi_{TW}$ that define these) shown in FIG. 3, the simulation apparatus of the present embodiment has a correction information calculation function that enables it efficiently to calculate just correction information $Ry_{TW}$ (or the angle of rotation $\phi_{TW}$ that defines it) in the event that correction information $R_{VS}$ (or the angles of rotation $\theta_{SV}$ and $\psi_{SV}$ that define it) has already been calculated.

Figure 5:
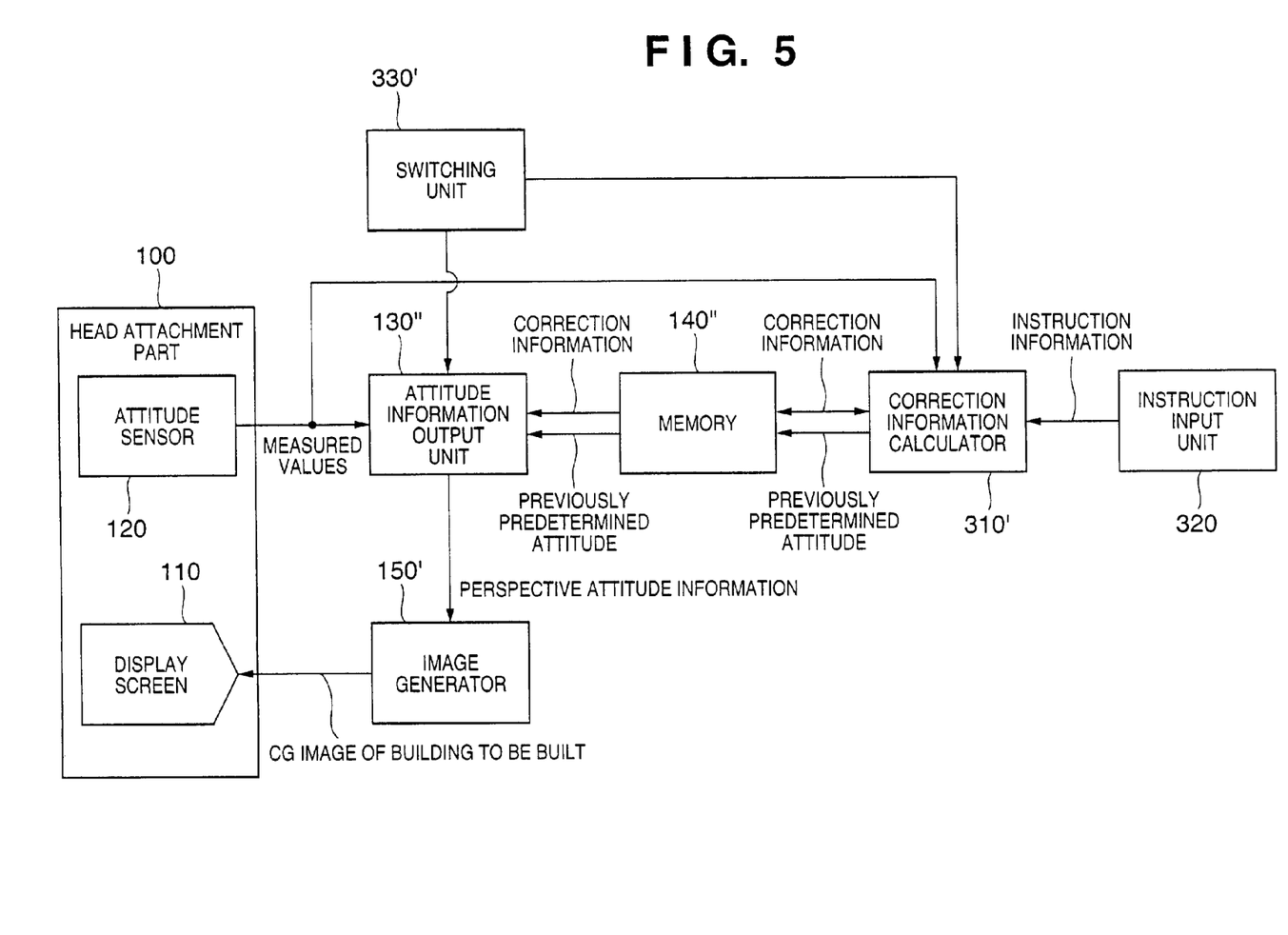
FIG. 5 is a block diagram of a scene simulation apparatus according to a first embodiment of the present invention.

FIG. 5 is a block diagram of a scene simulation apparatus according to a first embodiment of the present invention.

As shown in the diagram, the simulation apparatus of the present embodiment comprises attitude information output unit 130", correction information calculator 310', switching unit 330' and memory 140", corresponding to the attitude information output unit 130', the correction information calculator 310, the switching unit 330 and the memory 140' of the image display apparatus shown in FIG. 3. In addition, the image generator 150' has a function that generates a CG image of a building to be built as a virtual image.

It should be noted that the operation of the head attachment part 100, display screen 110, attitude sensor 120 and instruction input unit 320 is the same as that of the image display apparatus shown in FIG. 3 and so a description thereof is omitted.

In the present embodiment, the memory 140" contains the previously predetermined angle of direction $\phi^0_{SW}$ of the attitude sensor 120 of the global coordinate system 200 (or the rotation matrix $Ry^0_{SW}$ defined thereby), in addition to the correction information of the image display apparatus depicted in FIG. 3, the previously predetermined perspective attitude $Ry^0_{VW}$ (or the angle of rotation $\phi^0_{VW}$).

The switching unit 330' receives input from the user or operator (not shown in FIG. 5) and sets the attitude information output unit 130" mode to either the normal mode, a correction information calculation mode depicted in FIG. 3 (in this embodiment called a first correction information calculation mode), or a second correction information calculation mode for calculating correction information $Ry_{TW}$ of the image display apparatus. Similarly, the switching unit 330' sets the correction information calculator 310' mode to either the first correction information calculation mode or the second correction information calculation mode.

When set to the normal mode or the first correction information calculation mode, the attitude information output unit 130" outputs to the image generator 150' the same perspective attitude information as the attitude information output unit 130'. In other words, when in the normal mode, like the attitude information output unit 130 described with reference to FIG. 1, the attitude information output unit 130" calculates $R_{VW}$ using correction information from the $R_{ST}$ input from the attitude sensor 120 and outputs $R_{VW}$ to the image generator 150'. When set to the first correction information calculation mode, the attitude information output unit 130" inputs $Ry^0_{VW}$ from the memory 140" and outputs it as correction information to the image generator 150'.

If set to the second correction information calculation mode, the attitude information output unit 130" inputs measured values $R_{ST}$ (or the angle of rotation that defines same) from the attitude sensor 120, and further, inputs the correction information $R_{VS}$ and the previously predetermined rotation matrix $Ry^0_{SW}$ (or the angle of rotation that defines same) from the memory 140", and outputs to the image generator 150' the attitude $R'_{VW}$ (or the angle of rotation that defines same) calculated according to the following formula:

$$R'_{VW} = R_{VS}\_Rz_{ST}\_Rx_{ST}\_Ry^0_{SW} \quad \text{(Formula I)}$$

where $Ry^0_{SW}$ is equivalent to $Ry^0_{ST}\_Ry^0_{TW}$ (see Formula B). In other words, the measured value $R_{ST}$ of the attitude sensor 120 in Formula B is divided between angle of inclination components ($Rz_{ST}$ and $Rx_{ST}$) and an angle of direction component ($Ry_{ST}$), with the angle of direction component with respect to the global coordinate system 200 of the attitude sensor 120 being a fixed value ($Ry^0_{ST}\_Ry^0_{TW} = Ry^0_{SW}$).

In addition, when in the first correction information calculation mode, the correction information calculator 310' performs the same calculations as the correction information calculator 310. In other words, the correction information calculator 310 inputs an instruction to execute a correction information calculation from the instruction input unit 320, inputs the output $R^0_{ST}$ of the attitude sensor 120 at a point in time at which the user or operator determines that the perspective 220 is positioned at attitude $Ry^0_{VW}$, and calculates correction information based on the attitudes $Ry^0_{VW}$ and $R^0_{ST}$.

By contrast, when an instruction to execute a correction information process is input from the instruction input unit 320 while the correction information calculator 310' is set to the second correction information calculation mode, the correction information calculator 310' inputs the angle of direction $\phi^0_{ST}$ (or the rotation matrix $Ry^0_{ST}$ that is defined by same) from among the output of the attitude sensor 120 at the time, further inputs the angle of direction $\phi^0_{SW}$ (or the rotational matrix $Ry^0_{SW}$ defined thereby) from the memory 140", and outputs to the memory 140" correction information $\phi_{TW}$ (or a rotational matrix $Ry_{TW}$ defined thereby) calculated using the following formula:

$$\phi_{TW} = \phi^0_{SW} - \phi^0_{ST} \quad \text{(Formula J)}$$

Figure 6:
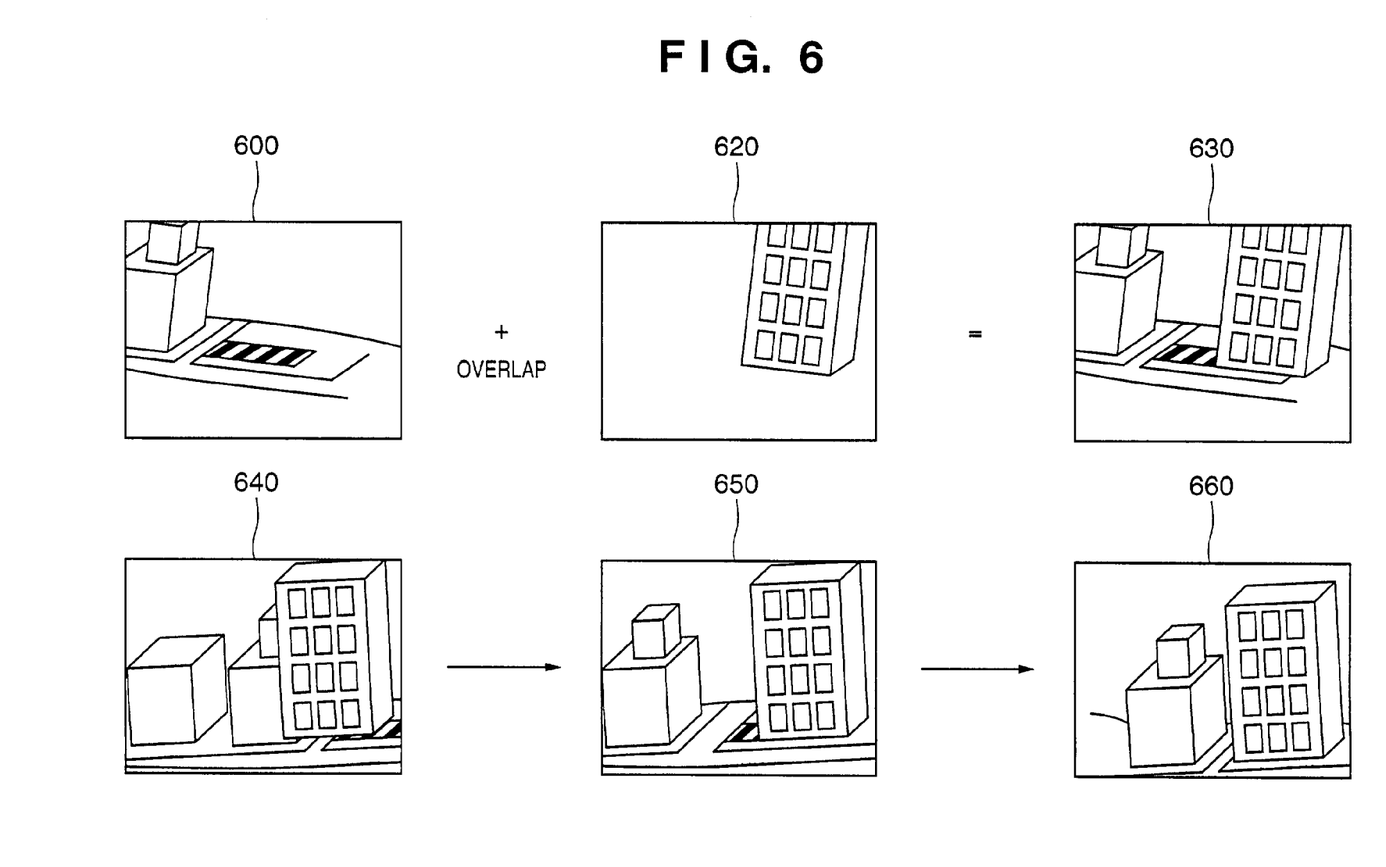
FIG. 6 illustrates the operating principles of a second correction information calculation mode according to a first embodiment of the present invention.

Next, a description is given of the operation of a simulation apparatus and a second correction information calculation mode according to the present embodiment, with reference to FIG. 6.

FIG. 6 illustrates the operating principles of a second correction information calculation mode according to a first embodiment of the present invention.

At the point in time at which the second correction information calculation mode is executed, the correction information $R_{VS}$ is already obtained. In the second correction information calculation mode, a user not shown in the diagram observes real space and, as a result, a real scene 600 is seen through the display screen 110. At this time, the image generator 150' inputs perspective attitude information output by the attitude information output unit 130'' based on Formula I, generates a CG image 620 of a building to be built and outputs that image to the display screen 110. With respect to the attitude sensor 120 attitude, Formula I uses the measured values provided by the attitude sensor 120 for the angles of inclination ($Rz_{ST}$ and $Rx_{ST}$) and uses fixed values for the angle of direction, so the CG image is generated in which inclination angle direction is linked to the perspective attitude and attitude in the direction angle is fixed. Accordingly, alignment of the observed image 630 observed by the user is carried out correctly for the inclination angle direction, with misalignment only in the angle of direction.

The user or operator (neither shown in the diagrams) then adjusts (640, 650, 660) the direction of the perspective so that the real scene and the virtual image (the CG image of the building slated for construction) are correctly aligned. When a correctly aligned image is observed (660), the user inputs an instruction to execute a correction information calculation to the instruction input unit 320. Since at this time there is no need to fix the perspective inclination angle, the attitude can be adjusted easily compared to the typical method.

Here, the perspective attitude information obtained by correcting the sensor 120 output at a point in time at which the real space image and the virtual space image are correctly aligned (660) using the correct correction information based on Formula B should be equal to the perspective attitude information calculated using Formula I. Accordingly, from Formula B and Formula I, the following formula can be derived:

$$R_{VS\_}R^{o}{}_{ST\_}Ry_{TW}=R_{VS\_}R^{o}{}_{ZST\_}R^{o}{}_{XST\_}Ry^{o}{}_{SW} \quad \text{(Formula K)}$$

Accordingly, $$Ry^{o}{}_{ST\_}Ry_{TW}=Ry^{o}{}_{SW} \quad \text{(Formula L)}$$

from which Formula J is derived. Accordingly, the correction information calculator 310' makes it possible to calculate correction information $\phi_{TW}$ based on Formula J.

Figure 7A:
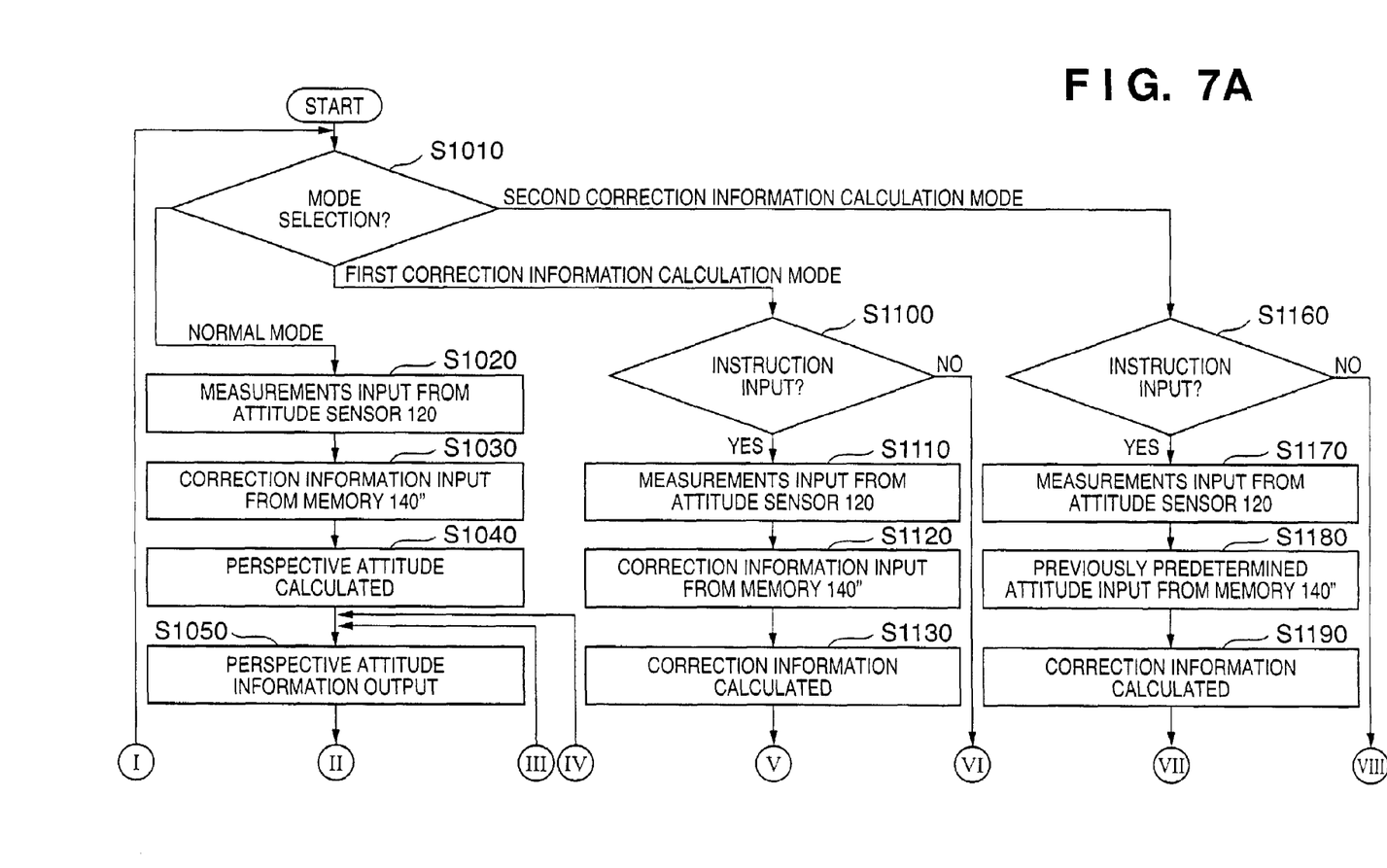
FIGS. 7A and 7B are a flowchart showing steps in a processing procedure performed by a scene simulation apparatus according to a first embodiment of the present invention.
Figure 7B:
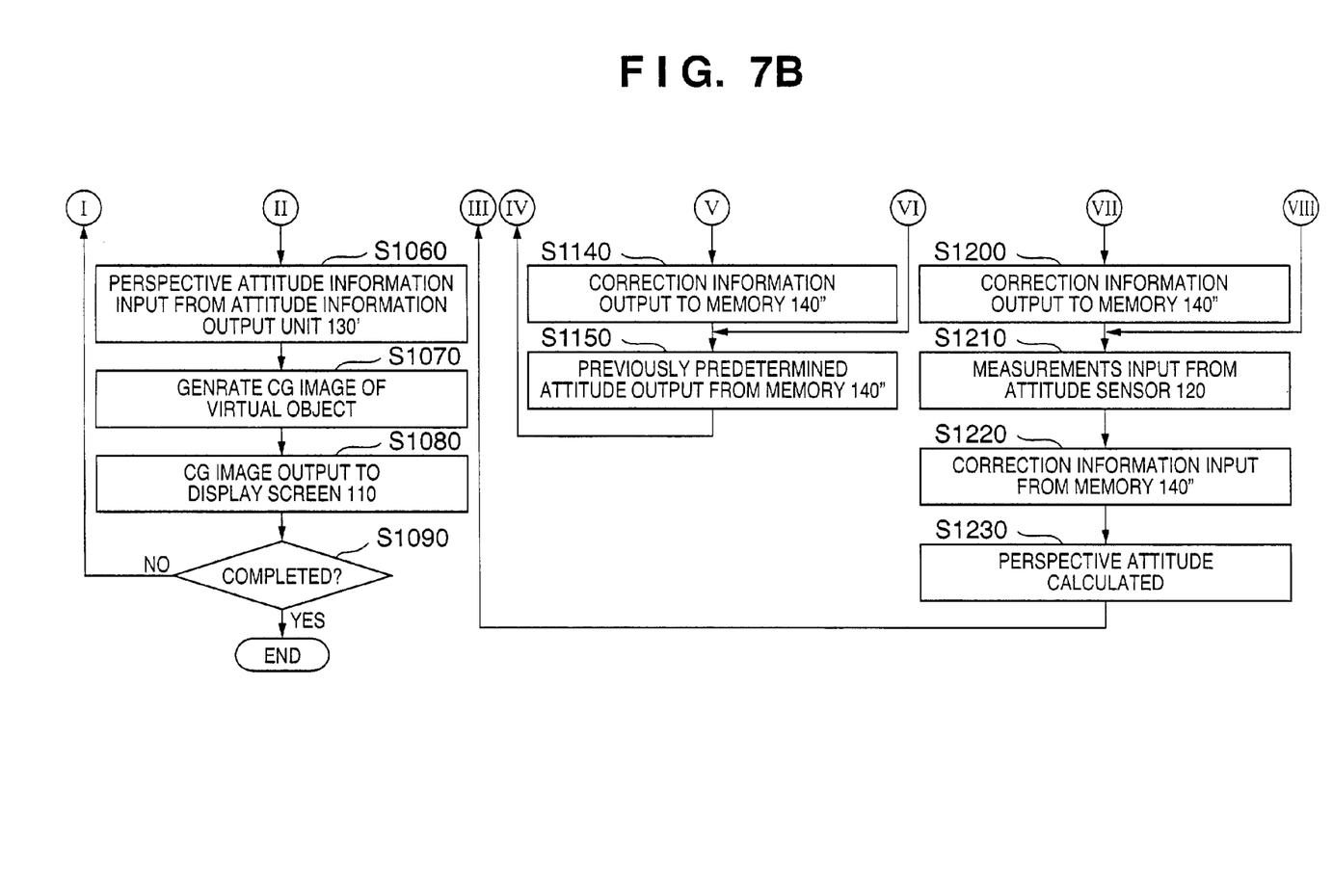

FIGS. 7A and 7B are a flowchart showing steps in a processing procedure performed by a scene simulation apparatus according to a first embodiment of the present invention. It should be noted that a program code that follows the flow chart is stored in a memory such as a RAM or ROM (not shown in the diagram), read by a CPU (also not shown in the diagram) and executed.

In a step S1010, it is determined whether the current mode of the switching unit 330' is normal mode, first correction information calculation mode or second correction information calculation mode. If the relative attitudes of the attitude sensor 120 and/or the display screen are changed when the attitude sensor 120 and/or the display screen 110 are first fixedly mounted on the head attachment part 100, then it is necessary to derive all the correction information. In such a case, the user or operator switches the mode to the first correction information calculation mode using the switching unit 330' and executes a correction information calculation.

In the first correction information calculation mode, processing proceeds to a step S1100 and a determination is made as to whether or not an instruction has been input from the instruction input unit 320.

If no instruction has been input, then the process proceeds from a step S1100 to a step S1150 and the attitude information output unit 130'' inputs previously predetermined attitude information from the memory 140''. Then, in a step S1050 this is output to the image generator 150' as perspective attitude information.

In a step S1060, the image generator 150' inputs perspective attitude information from the attitude information output unit 130'', which is then set as drawing parameters for a virtual object. Then, in a step S1070, the image generator 150' generates a CG image of a virtual object using the drawing parameters set in step S1060. In a step S1080, the CG image so generated is output to the display screen 110. By so doing, the image of a virtual object is displayed on the display screen 110 according to the previously predetermined attitude.

The above-described process is repeated throughout the first correction information calculation mode.

While the image of the virtual object is being displayed on the display screen 110 as described above, the user or operator adjusts the attitude in three dimensions of the head attachment part 100 so that the virtual object displayed on the display screen 110 and the real space are properly aligned, and inputs an instruction to the instruction input unit 320 at the point in time at which the user or operator determines that the virtual object and the real space are properly aligned.

If an instruction is input in the first correction information calculation mode, then the correction information calculator 310' inputs the values measured by the attitude sensor 120 in step S1110, and in a step S1120, inputs the previously predetermined attitude and correction information $Ry_{SV}$ (or the angle of rotation $\phi_{SV}$ that defines same) from the memory 140''. Further, in a step S1130, according to Formulas F, G and H the unknown correction information is calculated and in a step S1140 the correction information so calculated is output to the memory 140''.

By contrast, after correction information has been calculated in the first correction information calculation mode, in a case in which the simulation apparatus of the present embodiment is used again where relative attitudes of the attitude sensor 120 and the display screen 110 have not changed, the user or operator switches the mode to the second correction information calculation mode using the switching unit 330' and executes correction information calculation.

Where set to the second correction information calculation mode by the switching unit 330', the process proceeds to a step S1160 and it is determined whether or not an instruction has been input from the instruction input unit 320.

If no instruction has been input, then the attitude information output unit 130'', in a step S1210, inputs the values measured by the attitude sensor 120 and in a step S1220 inputs correction information $R_{VS}$ and previously predetermined rotation matrix $Ry^{o}{}_{SW}$ (or the angle of rotation that defines same) from the memory 140''. Then, in a step S1230 the attitude information output unit 130'' calculates the perspective attitude based on Formula I and outputs the perspective attitude information so calculated to the image generator 150' in step S1050.

The image generator 150' inputs the perspective attitude information from the attitude information output unit 130'' in step S1060 as drawing parameters for a virtual object. Further, in step S1070, the image generator 150' draws the virtual object. In step S1080, the generated CG image is output to the display screen 110. By so doing, the image of a virtual object fixed in a specific direction in its angle of direction only is displayed on the display screen 110.

The above-described process is repeated throughout the second correction information calculation mode.

While the image of the virtual object is being displayed on the display screen 110 as described above, the use or operator adjusts the angle of the direction of the head attachment part 100 so that the virtual object displayed on the display screen 110 and the real space are properly aligned (630-660 in FIG. 6), and inputs an instruction through the instruction input unit 320 at the point in time at which the user or operator determines that the virtual object and the real space are properly aligned.

If an instruction has been input, the correction information calculator 310', in a step S1170 inputs the measured values from the attitude sensor 120 and in a step S1180 inputs the previously predetermined angle of direction $\phi_{SW}$ (or the angle of rotation $Ry^{0}_{SW}$ defined thereby) from the memory 140". Further, in a step S1190, unknown correction information $\phi_{TW}$ is calculated according to Formula J and in a step S1200 the correction information so calculated is output to the memory 140". Thus, final correction information is stored in the memory 140".

Where set to the normal mode by the switching unit 330', then in a step S1020 the attitude information output unit 130" inputs the values measured by the attitude sensor 120 and in a step S1030 inputs correction information from the memory 140", and further, in a step S1040, calculates the perspective attitude information from the measured values and the correction information and outputs same to the image generator 150'.

In step S1060, the image generator 150' inputs the perspective attitude information from the attitude information output unit 130". In a step S1070, the image generator 1507 generates a CG image of a virtual object based on the perspective attitude information. Next, in a step S1080, the generated CG image is output to the display screen 110. By so doing, an image of the virtual object according to the perspective attitude is displayed on the display screen 110.

The above-described process is repeated throughout the normal mode.

It should be noted that the attitude information output unit 130", the memory 140", the image generator 150', the correction information calculator 310' the instruction input unit 320 and the switching unit 330' can, for example, be formed from a single computer (including a lap-top or the like). In addition, although the present embodiment includes a Tokimec Inc., TISS-5-40 attitude sensor, another type of attitude sensor may be used instead as a matter of course.

It should be noted that it is preferable that the input to the switching unit 330' and the instruction input unit 320 be provided via the same user interface, such as a keyboard, for example, or a control panel.

In addition, although the above-described embodiment is used to achieve an optical see-through type of MR, the present invention is not limited to such optical see-through type of MR. In such a case, in the above-described embodiment the attitude that is the user perspective 220 that is the object to be measured becomes the perspective of the image-sensing apparatus (a video camera, for example). In addition, in the case of the video see-through type of MR, the image generator 150' draws the CG image over the image of real space sensed by the image-sensing apparatus and outputs the results to the display screen 110.

(First Variation)

It should be noted that although the above-described embodiment uses a CG image of a virtual object that is the target of display to make alignment, any sort of geometrical information will be sufficient provided that such information affords some sort of visual cue that confirms the alignment of virtual space and real space. Thus, for example, the terrain and the shape of the actual building may be modeled and a wire-frame model of the building can be drawn over the actual space. As can be appreciated by those of ordinary skill in the art, it is of course possible to display an actual object of a wire frame model and a virtual object in combination.

(Second Variation)

In addition, the above-described embodiment, the image display apparatus and method of the present invention are applied to an observation simulation. As can be appreciated by those of ordinary skill in the art, however, the image display apparatus and method of the present invention can be applied to MR systems other than observation simulation. In addition, the image display apparatus and method of the present invention are not limited to MR systems but can be used in a variety of applications for measuring attitude of a perspective using attitude sensors.

(Third Variation)

Although the above-described embodiment uses a Tokimec Inc. attitude sensor TISS-5-40 for the attitude sensor, the present invention is not limited to the use of such a sensor but can instead be used with any sensor, provided that the sensor is an attitude sensor in which one of the sensor coordinate system axes is linked with a global coordinate system.

(Fourth Variation)

In the above-described embodiment, the correction information calculator 310 inputs as $R^{0}_{ST}$ the output of the attitude sensor at the time the instruction is input and uses that $R^{0}_{ST}$ to calculate the correction information (in step S1170). However, it is not always necessary to set the output of the attitude sensor at the time an instruction is input to $R^{0}_{ST}$. Thus, for example, the values measured by the attitude sensor before and after the point in time at which such instruction is input (for example the average of these values) may be used instead. Or, the perspective 220 may be set still for a certain time at attitude $Ry^{0}_{VW}$ and $R^{0}_{ST}$ may be obtained using an average value of the output of the attitude sensor 120 during that time. As long as the output of the attitude sensor 120 at the time the perspective 220 is positioned at attitude $Ry^{0}_{VW}$ can be obtained, $R^{0}_{ST}$ may be obtained by any methods.

(Fifth Variation)

In the above-described embodiment, the first correction information calculation mode is provided in order to obtain the correction information $R_{VS}$. However, the method of acquiring the correction information $R_{VS}$ is not limited to such an embodiment, and the correction information $R_{VS}$ may be obtained by any method. Thus, for example, the correction information $R_{VS}$ may be obtained through a process of trial and error as described with reference to the conventional art. In that case, functions related to the first correction information calculation mode in the above-described embodiment are not needed. In addition, the switching unit 330' switched between normal mode and second correction information calculation mode, the attitude information output unit 130" operates in the normal mode or the second correction information calculation mode, and the correction information calculator 310' operates in the second correction information calculation mode.

(Sixth Variation)

In the above-described embodiment, the normal mode overlappingly displayed a CG image according to changes in the attitude of the perspective (of a user) using the calculated correction information. However, the correction information so calculated can also be used solely for calculating the correction information of the image display apparatus according to the present invention, for example in an effort to use another image display apparatus. In that case, the normal mode of the above-described embodiment is unneeded, so the switching unit 330' can be eliminated and the attitude information output unit 130" can be made to operate strictly in the second correction information calculation mode.

(Seventh Variation)

Moreover, in the above-described embodiment, the switch from the second correction information calculation mode to the normal mode is accomplished by the switching unit 330'. However, the above-described switch may be accomplished using another method. Thus, for example, the switch from the second correction information calculation mode to the normal mode may be carried out when the input of an instruction by the instruction input unit 320 in the second correction information calculation mode causes the correction information calculator 310' to calculate the correction information.

(Other Embodiments)

As can be appreciated by those of skill in the art, the object of the present invention may also be achieved by a software program code for achieving the functions of the foregoing embodiments being recorded onto a storage medium (or recording medium) that is supplied to a system or an apparatus, with a computer of that system or apparatus then reading the program code stored on the recording medium. In such a case, the program code read from the recording medium itself achieves the functions of the above-described embodiments, and the recording medium on which that program code is recorded constitutes the present invention. In addition, the present invention includes also an instance in which the execution of the program code read by the computer not only results in the achievement of the functions of the above-described embodiments but also the operating system (OS) operating in the computer performs part or all of the actual processing based on the instructions of the program code, with the functions of the above-described embodiments being achieved based on that processing.

Moreover, as can be appreciated by those of skill in the art, the present invention also includes an instance in which the functions of the above-described embodiments are achieved by processes executed in whole or in part by a CPU or the like provided in a function expansion card or a function expansion unit based on program code instructions, after the program code read from the recording medium is written to a memory provided in such a function expansion card inserted into the computer or such a function expansion unit connected to the computer.

Furthermore, the present invention can be applied to a system comprising either a plurality of units or a single unit. Needless to say, the present invention can be applied to a case in which the functions of the above-described embodiments can be attained by supplying programs which execute the processes defined by the present system or invention.

As many apparently widely different embodiments of the present invention can be made without departing from the spirit and scope thereof, it is to be understood that the invention is not limited to the specific embodiment thereof except as defined in the claims.

What is claimed is:

1. An image display apparatus that displays a virtual image on a display screen according to an attitude of a user observing the display screen, the image display apparatus comprising:

an attitude sensor that outputs an attitude measurement including an angle of inclination component and an angle of direction component;

a conversion unit adapted to convert the attitude measurement from said attitude sensor into an attitude of a user in a reference coordinate system, by using correction information;

a display unit adapted to combine a virtual image generated based on the attitude of the user and an image of real space, and display the combined image on the display screen;

a calculation unit adapted to calculate the attitude of the user based on a predetermined angle of direction and the angle of inclination component of the attitude measurement and without the angle of direction component of the attitude measurement;

an instruction input unit adapted to receive a user's instruction which indicates that the user confirmed that the virtual image and the image of real space are in the correct positional relationship;

a calibration unit adapted to calibrate information relating to an angle of direction in the correction information based on the predetermined angle of direction and the angle of direction component of the attitude measurement from said attitude sensor when the user's instruction is received by said user instruction input unit so as to calibrate the attitude sensor; and a mode setting unit adapted to set one of a plurality of modes, the modes including a normal mode and a correction information calculation mode, wherein in the normal mode the virtual image is generated in accordance with the attitude of the user converted by said conversion unit, and wherein in the correction information calculation mode, the virtual image is generated in accordance with the attitude of the user calculated by said calculation unit, and the calibration unit calibrates the information relating to the angle of direction in the correction information so as to calibrate the attitude sensor.

2. The apparatus according to claim 1, wherein said display unit optically combines the virtual image and the image of real space.

3. The apparatus according to claim 1, wherein the image of real space is an image captured by a capture unit, and said display unit superimposes the virtual image on the image of real space.

4. The apparatus according to claim 1, wherein the attitude measurement utilized by said calibration unit is the attitude measurement from said attitude sensor at around a point in time at which said predetermined instruction is input.

5. An image display method that displays a virtual image on a display screen according to an attitude of a user observing the display screen while optically transmitting an image of real space onto said display screen, the image display method comprising:

inputting an attitude measurement from an attitude sensor that measures attitude in three degrees of freedom, the attitude measurement including an angle of inclination component and an angle of direction component;

fixing the angle of direction of the attitude measurement in a reference coordinate system of the attitude sensor at a predetermined angle of direction;

calculating the attitude of a user based on the predetermined angle of direction and on the angle of inclination component of said attitude measurement and without the angle of direction component of said attitude measurement;

generating the virtual image based on the calculated attitude;

receiving a user' instruction which indicates that the user confirmed that the virtual image and the image of real space are in the correct positional relationship;

calibrating information relating to an angle of direction in correction information based on the predetermined angle of direction and the angle of direction component of the attitude measurement from the attitude sensor when the instruction is received in said receiving step so as to calibrate the attitude sensor; and setting one of a plurality of modes, the modes including a normal mode and a correction information calculation mode, wherein in the normal mode the virtual image is generated in accordance with the attitude of the user whose attitude is calculated in said calculating step, and wherein in the correction information calculation mode, the virtual image is generated in accordance with the attitude of the user whose attitude is calculated in said calculating step, and said calibration step calibrates the information relating to the angle of direction in the correction information so as to calibrate the attitude sensor.

6. A computer-readable medium encoded with a computer program that causes a computer to execute the image display method according to claim 5.

* * * * *